US005317347A

United States Patent [19]

Masuda et al.

[11] Patent Number: 5,317,347

[45] Date of Patent: May 31, 1994

[54] IMAGE FORMING APPARATUS

[75] Inventors: Tomohiko Masuda; Ken Matsubara, both of Takatsuki; Tsukasa Yagi, Toyonaka; Koji Wakamiya; Hirohisa Kitano, both of Osaka, all of Japan

[73] Assignee: Minolta Camera Kabushiki Kaisha, Osaka, Japan

[21] Appl. No.: 6,159

[22] Filed: Jan. 19, 1993

Related U.S. Application Data

[63] Continuation of Ser. No. 688,172, Apr. 19, 1991, abandoned.

[30] Foreign Application Priority Data

Apr. 20, 1990 [JP] Japan .................................. 2-105671
Apr. 20, 1990 [JP] Japan .................................. 2-105672

[51] Int. Cl.[5] .............................................. G01D 15/14

[52] U.S. Cl. .................................... 346/160; 346/108; 355/245; 355/268

[58] Field of Search ................ 346/160, 108; 355/210, 355/219, 245, 251, 355; 430/100

[56] References Cited

U.S. PATENT DOCUMENTS 4,154,505 5/1980 Kato et al. .......................... 359/252
4,591,886 5/1986 Umeda et al. .................. 346/108 X
4,902,111 2/1990 Matsubara et al. ................. 359/254
5,025,288 6/1991 Kusuda .............................. 355/251

FOREIGN PATENT DOCUMENTS 33-82223 5/1958 Japan .
35-83008 5/1960 Japan .

*Primary Examiner*—A. T. Grimley
*Assistant Examiner*—Sandra L. Brasé
*Attorney, Agent, or Firm*—Price, Gess & Ubell

[57] ABSTRACT

An image forming apparatus which comprises a light shutter disposed between a source of light and an image carrier, which is electrostatically charged to a predetermined polarity, and capable of exhibiting a light transmissivity which varies according to a voltage applied to the light shutter. A first voltage of a predetermined direction is applied to the light shutter according to image information during a first period in which a first area of the image carrier passes across the light shutter, to form the electrostatic latent image on the image carrier. This electrostatic latent image is subsequently developed into a toner image. In order to substantially recover the light shutter from a light-induced fatigue, i.e., internal polarization of an electro-optical material forming the light shutter, a second voltage of a direction counter to the predetermined direction is applied to the light shutter during a second period in which a second area of the image carrier passes across the light shutter.

12 Claims, 6 Drawing Sheets

Charging

Exposure

Developing

IMAGE FORMING APPARATUS

This is a continuation of application Ser. No. 07/688,172, filed on Apr. 19, 1991 now abandoned, for an IMAGE FORMING APPARATUS.

BACKGROUND OF THE INVENTION

1. Field of the Invention

The present invention generally relates to an image forming apparatus utilizing an electrophotographic process and, more particularly, to the image forming apparatus wherein an electro-optical material such as PLZT (a kind of solid-solution ceramic material expressed by a chemical formula, $(Pb_{0.921}La_{0.079})(Zr_{0.70}Ti_{0.30})_{0.98}O_3$) is employed for a light shutter and wherein a drive voltage proportional to information to be reproduced is selectively applied to a plurality of electro-optical materials to vary the amount of light passing through the light shutter so that the light passing through the light shutter can be utilized to form a recording by means of the electrophotographic process.

2. Description of An Prior Art

The image forming apparatus utilizing the light shutter is well known in the art. In this image forming apparatus, the electro-optical materials are exposed to rays of light at all times and, when a drive voltage is applied to some of the electro-optical materials, light modulating portions of some of the electro-optical materials permit the passage of recording light therethrough. The drive voltage is generally of a value required to cause the electro-optical materials to form an electric field in a predetermined direction. It has been found that a repeated application of the drive voltage to the electro-optical materials for a substantial period results in an internal polarization, that is, light-induced fatigue, occurring in some of the electro-optical materials, which in turn results in a change in drive voltage of a value required to maximize the light transmission through the light shutter, that is, a so-called half-wavelength voltage.

In order to recovery the electro-optical materials from the light-induced fatigue thereby to avoid any possible change in the half-wavelength voltage, some of the inventors of the present invention have suggested an image forming method wherein, during a non-recording period in which no recording is carried out, a recovery voltage intended to recover the electro-optical materials from the light-induced fatigue is applied to the electro-optical materials so as to form an electric field in a direction opposite to that formed by the application of the drive voltage during a recording period. This suggested method is disclosed in U.S. Pat. No. 4,902,111 issued Feb. 20, 1991.

On the other hand, in the image forming apparatus utilizing an electrophotographic process, a recording of an image on a recording medium such as, for example, paper is carried out by radiating imagewise rays of light to a photoreceptor surface to form an electrostatic latent image and then applying toner material to the electrostatic latent image to form a toner image which is subsequently transferred onto and fixed on the recording medium. This electrophotographic process may possibly be classified into two types depending on the manner by which the electrostatic latent image is developed into the toner image. One type may be referred to as a positive-to-positive system wherein the portion of the electrostatic charge built up on the photoreceptor surface which has been exposed to the imagewise rays of light is depleted to form a positive electrostatic latent image on the photoreceptor drum and, during a developing step, toner material charged to a polarity opposite to that of the positive electrostatic latent image is applied to the remaining portion of the electrostatic charge, that is, the positive electrostatic latent image, thereby to form the toner image. The other may be referred to as a negative-to-positive system wherein a portion of the electrostatic charge built up on the photoreceptor surface which has been exposed to the imagewise rays of light is depleted to form a negative electrostatic latent image on the photoreceptor drum and, during a developing step, toner material charged to the same polarity as that of the negative electrostatic latent image is applied to that portion of the electrostatic charge, that is, the negative electrostatic latent image, thereby to form the toner image.

According to the previously discussed image forming method, while the recovery voltage, that is, the voltage used to recover the electro-optical materials from the light-induced fatigue, is applied to the electro-optical material during the non-recording period, it has been found that the application of the recovery voltage tends to allow the rays of light to pass through a portion of the light shutter where the recovery voltage has been applied. Because of this, where the prior art light shutter is employed in the electrophotographic image forming apparatus utilizing the negative-to-positive developing system, the application of the recovery voltage takes place during the non-recording period and does, therefore, not affect the recording.

However, a relatively large quantity of toner material tends to be deposited during the developing step on a portion of the photoreceptor surface which is exposed to rays of light having passed through a light modulating portion as a result of the application of the recovery voltage. The toner material so deposited on that portion of the photoreceptor surface does not participate in the recording and is subsequently removed therefrom by a cleaning means without being transferred onto the recording medium, thus posing a problem associated with a waste of toner material.

Also, repeated deposition and removal of the toner material in relation to the photoreceptor surface tends to allow toner material to scatter and, therefore, not only the inside of the image forming apparatus, but also some recording mediums tend to become dirty.

SUMMARY OF THE INVENTION

Accordingly, the present invention is intended to provide an improved electrophotographic image forming apparatus of negative-to-positive developing system, which is designed to minimize a waste of toner material and also to minimize or substantially eliminate a scattering of toner material within the machine housing and which is effective to permit the recover of the light-induced fatigue electro-optical materials forming the light shutter.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE EMBODIMENTS

Figure 1:
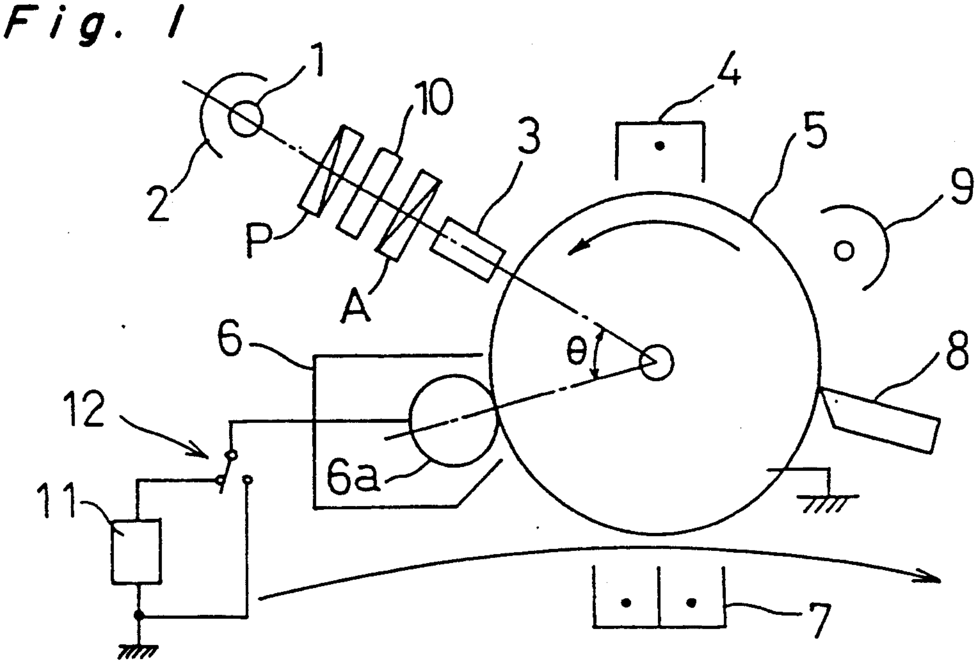
FIG. 1 is a schematic diagram showing an electrophotographic image forming apparatus embodying the present invention.

Before the description of the preferred embodiments of the present invention proceeds, it is to be noted that like parts are designated by like reference numerals.

Referring to FIG. 1, there is schematically shown an optical printer to which the present invention is applicable. The optical printer shown therein comprises a source of light 1 including a reflector 2, a photoreceptor drum 5 supported for rotation in one direction about an axis of rotation thereof, a light shutter head 10 intervening between the light source 1 and the photoreceptor drum 5, a polarizer plate P positioned on one side of the shutter head 10 adjacent the light source 1, an analyzer plate A positioned on the other side of the shutter head 10 adjacent the photoreceptor drum 5, and an array 3 of bundled rod lenses interposed between the analyzer plate A and the photoreceptor drum 5. It is to be noted that the polarizer plate P and the analyzer plate A are so positioned relative to each other that the axis of polarization of one of them extends perpendicular to that of the other of them.

Rays of light from the light source 1, which may be a lamp as shown, are collected by the reflector 2 and then travel towards the shutter head 10 through the polarizer plate P. The shutter head 10 is operable in dependence on image information representative of an image to be recorded on a recording medium to selectively vary the axis of polarization of the incident light thereby to control the light which subsequently passes through the analyzer plate A. The rays of light emerging from the analyzer plate A are guided by the bundled rod lens array 3 towards a photosensitive surface of the photoreceptor drum 5, which has been charged by a charger 4, to form an electrostatic latent image on the photosensitive surface. The formation of the electrostatic latent image on the photosensitive surface of the photoreceptor drum 5 is carried out by a character writing operation of the shutter head 10 and the electrostatic latent image so formed is of a negative nature. The negative electrostatic latent image is subsequently developed by a developing unit 6 into a positive powder image.

A process from the formation of the negative electrostatic latent image to the development of the negative electrostatic latent image into the positive powder image will now be described with reference to potential model diagrams of FIGS. 2(*a*) to 2(*c*).

Figure 2A:
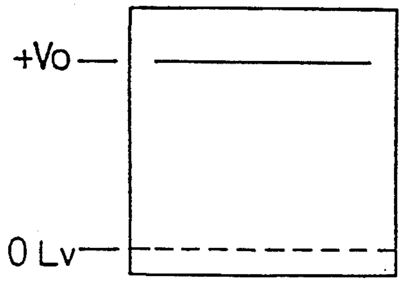
FIG. 2(*a*) to 2(*c*) are model diagrams showing the potential varying from the charging to the developing.
Figure 2B:
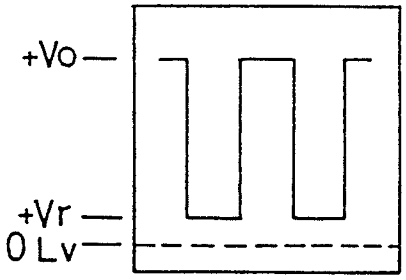
Figure 2C:
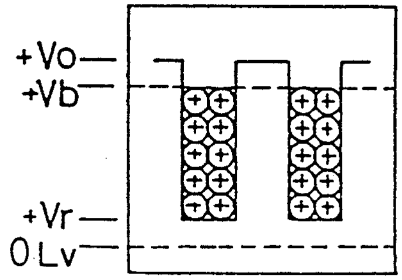

The photoreceptor drum 5 being driven in one direction shown by the arrow has its photosensitive surface which is substantially uniformly charged by the charger 4 to a potential +Vo as shown in FIG. 2(*a*) at a charging station. Then at an exposure station following the charging station, the photosensitive surface of the photoreceptor drum, hereinafter referred to as the photoreceptor surface, is radiated with imagewise rays of light in an area thereof corresponding to a black area of an image to be recorded according to the image information and, hence, the electrostatic charge at that area of the photoreceptor surface is depleted to a potential +Vr as shown in FIG. 2(*b*). At a developing station following the exposure station, while a predetermined bias voltage shown by +Vb from a bias voltage source 11 is applied to the photoreceptor surface, a relationship between the bias voltage +Vb and the potential +Vr at that area of the photoreceptor surface from which the charge has been depleted in correspondence with the image is such that toner particles charged to a positive polarity within the developing unit 6 can be selectively adsorbed onto the photoreceptor surface to develop the area of potential +Vr into a powder image as shown in FIG. 2(*c*).

During the continued rotation of the photoreceptor drum 5, the powder image formed on the photoreceptor surface in the manner described above is subsequently transported to a transfer station at which the powder image is transferred by a transfer charger 7 onto a recording medium. The toner particles and the electrostatic charge both remaining on the photoreceptor surface subsequent to the transfer of the powder image onto the recording medium are, at a cleaning station, removed therefrom by a cleaner 8 and by a charge eraser 9, respectively, in readiness for the next cycle of operation.

Figure 3:
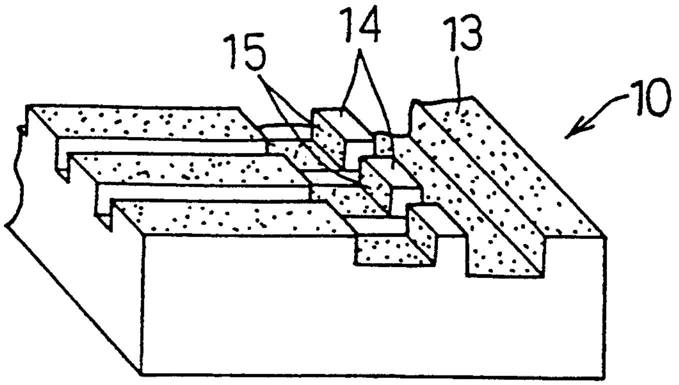
FIG. 3 is a fragmentary perspective view of a PLZT.

So far illustrated, an electro-optical material used to form the light shutter head 10 is employed in the form of PLZT [$(Pb_{0.92}La_{0.079})(Zr_{0.70}Ti_{0.30})_{0.98}O_3$]. As best shown in FIG. 3, the light shutter head 10 comprises a single row of a plurality of shutter elements 14. These shutter elements 14 are separated from each other by the intervention of grooves formed on a PLZT substrate, and are sandwiched between electrodes 15 and 13 formed on respective side wall faces confronting the grooves, the electrodes 15 being provided one for each shutter element 14 while the electrode 13 is common to all of the shutter elements 14.

Figure 4:
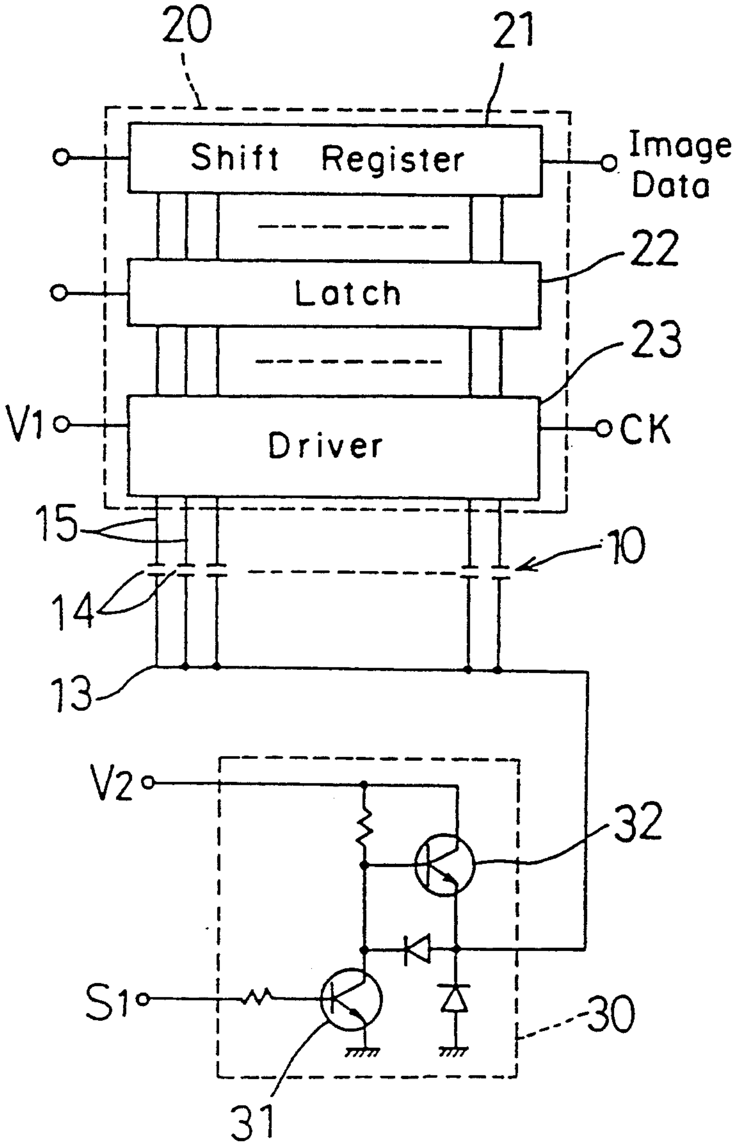
FIG. 4 is a circuit block diagram showing a drive circuit.

A drive circuit used to drive the light shutter head 10 is shown in FIG. 4 wherein each of the shutter elements 14 forming the shutter head 10 is identified by a symbol indicative of a capacitor.

As shown in FIG. 4, for driving the shutter head 10, the individual electrodes 15 for the respective shutter elements 14 are connected with a first drive circuit 20 while the common electrode 13 common to all of the shutter elements 14 is connected with a second drive circuit 30. The first drive circuit 20 comprises a shift register 21 to which image data, i.e., image information representative of an image to be recorded, are serially inputted for each line, a latch circuit 22 for latching all of the image data inputted to the shift register 21, and a driver 23 for selectively applying a direct current drive voltage V1 (V1>0) to the individual electrodes 15 in dependence on the image data latched in the latch circuit 22. A clock signal CK used to define the timing at which the drive voltage V1 is to be applied selectively to the individual electrodes 15 is applied to the driver 23.

The second drive circuit 30 includes a first switching transistor 31 which, when switched on, connects the common electrode 13 to the ground, and a second switching transistor adapted to be switched on to apply a direct current voltage V2 (V2>0) to the common electrode 13 when and so long as the first switching transistor is switched off. The first switching transistor 31 has a base to which a control signal S1 is applied to switch the first transistor 31 on. It is to be noted that this control signal S1 assumes a high level state only during an execution of a recording operation.

The optical printer utilizing the light shutter head 10 of the type hereinbefore described operates in the following manner.

Figure 5:
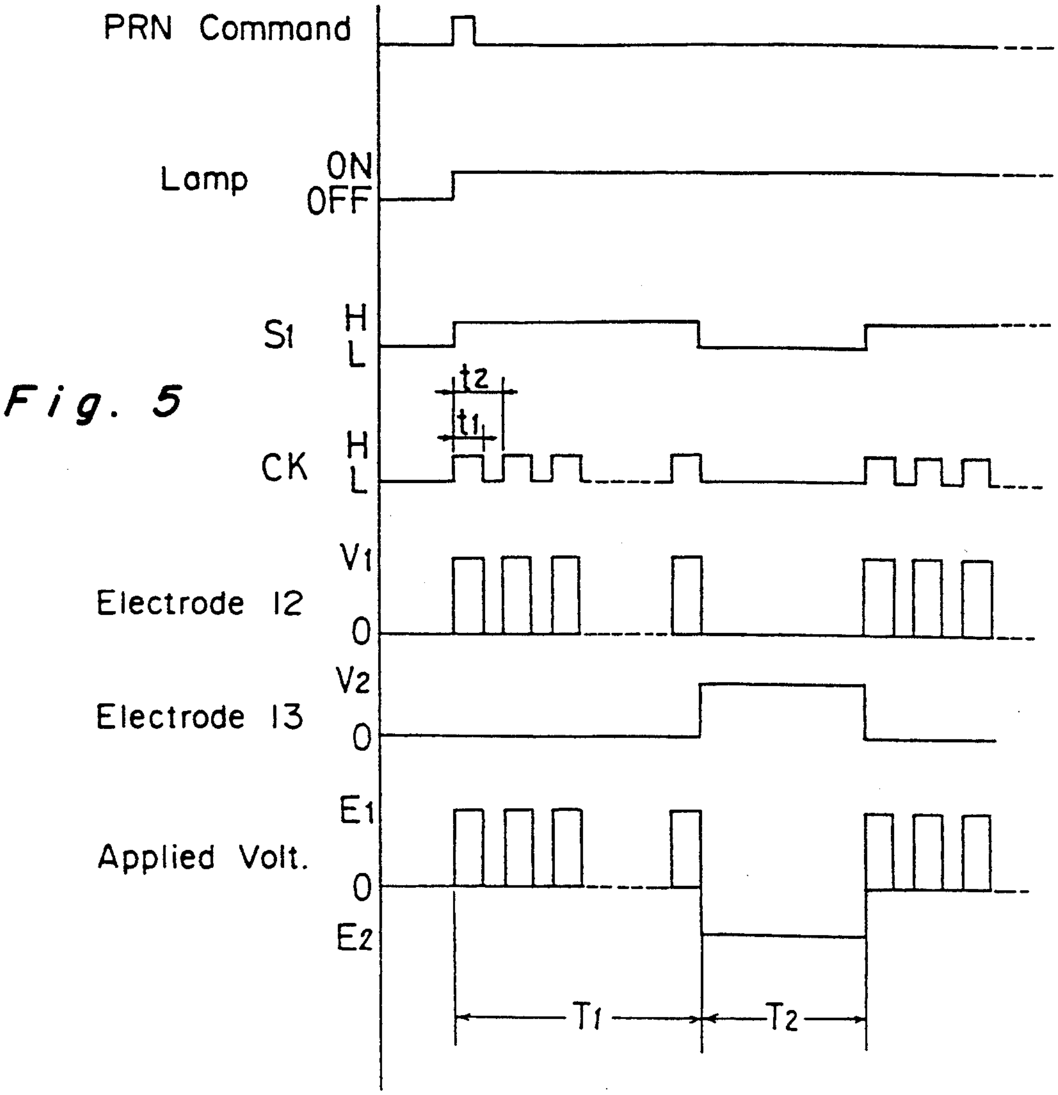
FIG. 5 is a timing chart for a recording operation.

With reference to the timing chart shown in FIG. 5, when a PRINT (PRN) command is inputted to initiate a recording of the image, the lamp forming the light source 1 is lit and, at the same time, the image data are inputted to and latched in the first drive circuit 20 for each line. In response to the clock signal CK applied to the driver 23, the latter applies the drive voltage V1 selectively to the individual electrodes 15 in dependence on the image data so latched. At this time, the control signal S1 applied to the second drive circuit 30 is rendered in a high level state so that the first transistor 31 can be switched on to connect the common electrode 13 to the ground, as can be seen in FIG. 4. Accordingly, an electric field E1 developing in a predetermined direction is formed between the common electrode 13 and some of the individual electrodes 15 to which the positive drive voltage has been selectively applied and, by the action of the electric field E1, some of the shutter elements 14 energized by the application of the positive drive voltage V1 are switched on to pass the rays of light therethrough. On the other hand, no electric field is formed between the common electrode 13 and the remaining individual electrodes 15 to which no drive voltage V1 is applied and, therefore, the remaining shutter elements 14 corresponding to the remaining individual electrodes 15 remain switched off to intercept the passage of rays of the light therethrough. This ON/OFF control of the shutter elements 14 are executed for each line of image data in synchronism with a rotation of the photoreceptor drum 5 and is repeated until a single page of image is completely recorded on the recording medium.

During a non-recording period $T_2$ subsequent to the completion of the recording of one page of image and prior to the start of recording of the next succeeding page of image, the control signal S1 to be applied to the second drive circuit 30 is rendered in a low level state and, on the other hand, the clock signal CK is also rendered in a low level state. Accordingly, during this non-recording period $T_2$, the second transistor 32 is switched on to apply the positive voltage V2 to the common electrode 13 while the individual electrodes 15 are maintained at a ground level (zero level). In this condition, an electric field E2 developing in a direction counter to the direction in which the electric field E1 has developed during a recording period $T_1$ is formed between the individual electrodes 15 and the common electrode 13 and, consequently, all of the shutter elements 14 are switched on. Thus, during the non-recording period $T_2$, the rays of light pass through all of the shutter elements 14 of the shutter head 10 and are then guided towards the photoreceptor drum 5 and, therefore, the electrostatic charge built up on the photoreceptor surface is depleted.

According to the foregoing embodiment, the internal polarization, that is, the light-induced fatigue, caused by the electric field E1 acting in one direction during the recording period $T_1$ can be substantially eliminated by causing the electric field E2 to act on the shutter head 10 during the non-recording period $T_2$ in the opposite direction counter to such one direction in which the electric field E1 acts during the recording period $T_1$. Accordingly, as shown by a broken line in the graph of FIG. 6, the amount of light passed through the shutter head 10, measured after a four-hour continuous use thereof, relative to the applied drive voltage does not bring about a substantial deviation from the initial characteristic shown by the solid line in FIG. 6.

Figure 6:
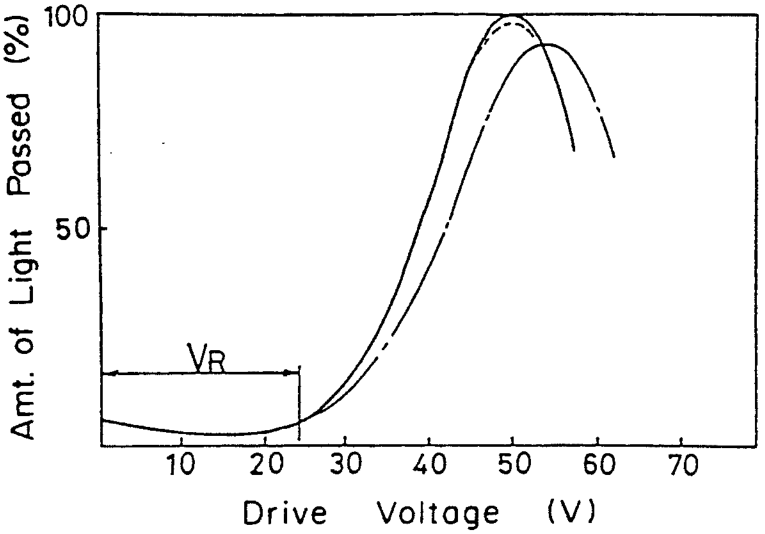
FIG. 6 is a graph showing a relationship between the drive voltage and the amount of light passed.

In contrast thereto, the single-dotted line in the graph of FIG. 6 illustrates a characteristic of the shutter head 10 measured after a four-hour continuous use thereof and exhibited in the event that no electric field was developed in the shutter head 10 during the non-recording period $T_2$.

It is to be noted that the data shown in the graph of FIG. 6 were obtained as a result of experiments conducted under the following conditions.

| | |
|---|---|
| Peripheral Velocity of the Photoreceptor Drum 5: | 18 cm/sec. |
| Duty Ratio d of Clock Signal CK during the Recording Period $T_1$ (t1/t2): | 50 |
| Recording Period $T_1$ Elapsed to Complete 1 Page Recording (A-4 size, Horizontal): | 1.1 sec. |
| Non-recording Period $T_2$ | 0.8 sec. |
| Electric Field E2: | 28 volts |

Figure 7:
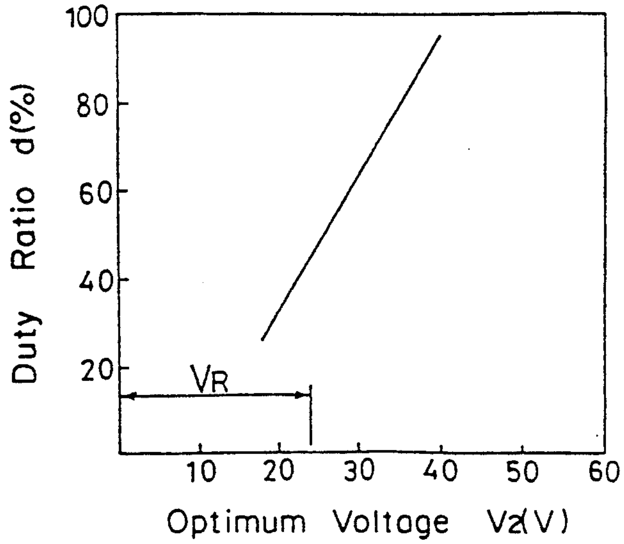
FIG. 7 is a graph showing relationship between an optimum voltage and a duty ratio.

An optimum intensity of the electric field applied to the shutter head 10 during the non-recording period $T_2$ depends on the length of time over which the electric field is applied on the shutter head 10 during the recording period $T_1$ and, more specifically, depends on the duty ratio d of the clock signal CK during the recording period and the ratio D ($=T_1/T_2$) of the recording period $T_1$ relative to the non-recording period $T_2$. By way of example, where the recording period $T_1$ runs for 1.1 second and the non-recording period $T_2$ runs for 0.8 second, the voltage E2 required to render the electric field developed during the non-recording period $T_2$ to attain the optimum intensity is of a value proportional to the duty ratio d as shown in the graph of FIG. 7.

In describing the foregoing embodiment of the present invention, it has been described that the positive drive voltage V1 is applied to the individual electrodes 15 during the recording period $T_1$ and the positive voltage V2 is applied to the common electrode 13 during the non-recording period $T_2$. However, if the directions in which the electric fields are developed in the shutter head 10 during the recording period $T_1$ and the non-recording period $T_2$, respectively, are desired to be changed, an alternative method may be employed in which the common electrode 13 is grounded at all times and voltages of different polarity are applied to the individual electrodes 15 during the recording period $T_1$ and the non-recording period $T_2$.

By the utilization of the method of driving the shutter head 10 as hereinabove described, a stabilized exposure operation can be achieved without being accompanied by a variation in amount of the light passing through the shutter head 10. On the other hand, as hereinbefore described, during the non-recording period $T_2$ relative to the recording period $T_1$, all of the rays of light are allowed to pass through all of the shutter elements 14 of the shutter head 10 and are guided towards the photoreceptor surface of the photoreceptor drum 5 to deplete a major portion of the electrostatic charge built up on the photoreceptor surface. Accordingly, that area of the photoreceptor surface from which the electrostatic charge is depleted during the non-recording period $T_2$ is, if all the operation is assumed to be identical with that during a normal image recording, developed by the developing unit 6 with a relatively large amount of toner material being consumed consequently. Once this occurs, not only does the scattering of toner material occur within the housing of the optical printer and the interior of the printer housing may therefore be dirtied, but also the cleaning unit 8 tends to be overloaded so much as to result in a trouble such as, for example, insufficient cleaning.

In view of the foregoing, according to the present invention, during the non-recording period $T_2$, the shutter head 10 is applied with the electric field of an intensity enough to allow the passage of the rays of light through the shutter head in a quantity required to lower the potential of the photoreceptor surface down to a value higher than a developing bias voltage +Vb.

More specifically, referring to FIG. 6 which illustrates the relationship between the drive voltage and the amount of light passed, an area indicated by $V_R$ represents an area in which all of the shutter elements 14 of the shutter head 10 are substantially closed to intercept the passage of the rays of light through the shutter head 10. On the other hand, as shown in FIG. 7, the voltage $V_2$ necessary to optimize the intensity of the electric field developed during the non-recording period $T_2$ is proportional to the duty ratio d of the clock signal CK during the recording period $T_1$ and may suffice to be low if the duty ratio d is low. Accordingly, the duty ratio d of the clock signal CK has to be so chosen that the voltage $V_2$ may fall within the area $V_R$ in which the shutter elements 14 are closed. On the other hand, the voltage $V_2$ to be applied to the shutter head 10 during the non-recording period $T_2$ is so selected as to satisfy the relationship shown in FIG. 7 with the duty ratio d so chosen in the manner as hereinabove described.

The optimum voltage $V_2$ used to recover the electro-optical elements 14 from the light-induced fatigue has the following relationship:

$$V_2 \propto V_1 \cdot (t_1 \cdot T_1)/(t_2 \cdot T_2)$$

Therefore, instead of choosing the duty ratio d ($=t_1/t_2$) in the manner as hereinabove described, the non-recording period $T_2$ may be prolonged relative to the recording period $T_1$.

Figure 8:
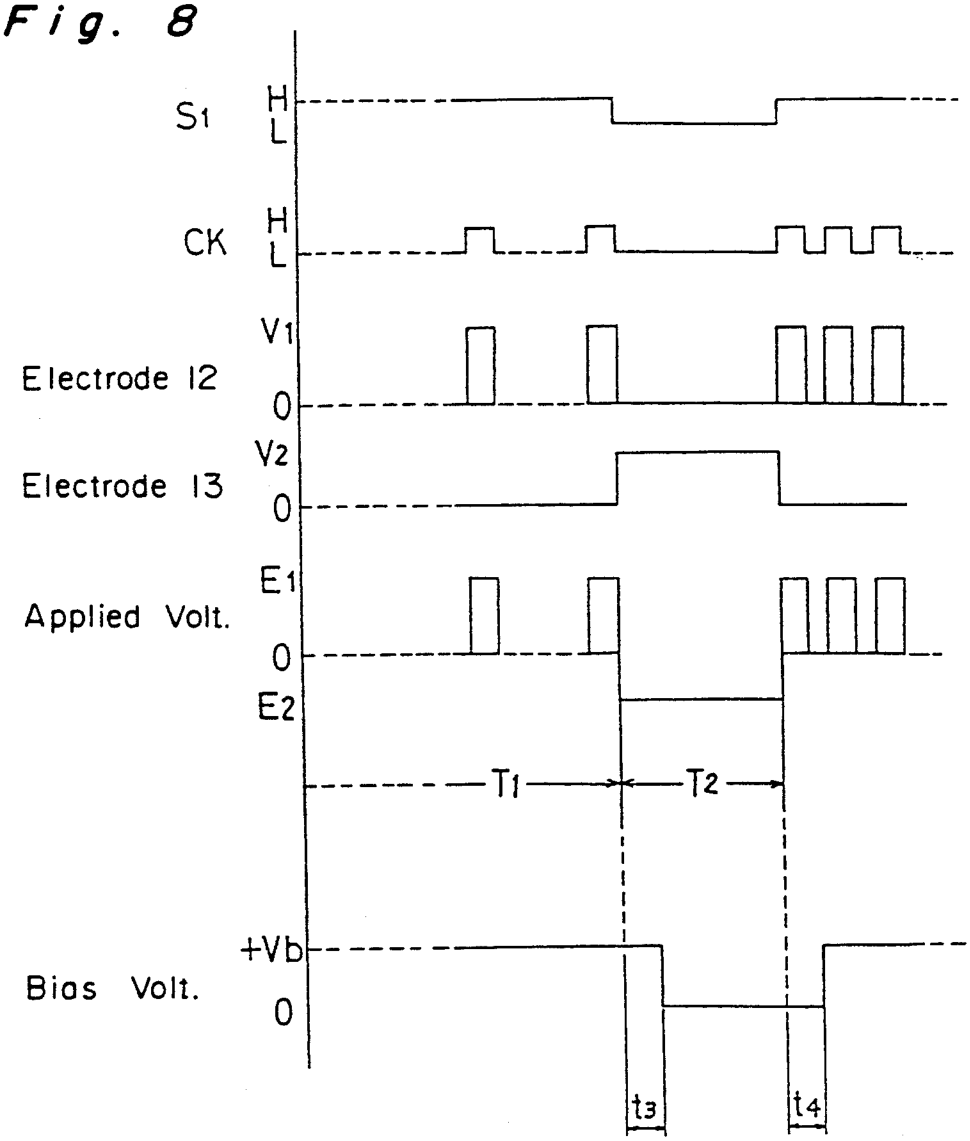
FIG. 8 is a timing chart for a control operation in which a bias voltage is applied.

Another preferred embodiment of the present invention will now be described with reference to FIGS. 1 and 8. This second embodiment of the present invention is so designed that, in order to interrupt a development of that area of the photoreceptor surface from which the electrostatic charge has been depleted during the non-recording period $T_2$, the supply of the bias voltage +Vb from a bias voltage source 11 to a developing sleeve 6a can be interrupted by switching a switch 12 to connect the developing sleeve 6a to the ground. The timing at which the developing sleeve 6a is connected to the ground is shown in FIG. 8.

The recording operation with respect to 1 page of information is carried out in the manner as hereinbefore described in connection with the first preferred embodiment of the present invention. When the non-recording period $T_2$ starts subsequently, the control signal S1 inputted to the second drive circuit 30 is rendered in a low level state and, consequently, the electric field $V_2$ is formed in all of the shutter elements 14. The bias voltage of a potential +Vb for the one-page recording is, during the non-recording period $T_2$, zeroed a predetermined time $t_3$ after the timing at which the control signal S1 sets down. This bias voltage resumes the potential +Vb a predetermined time $t_4$ after the timing at which the control signal S1 once set down sets up, that is, the timing at which the non-recording period $T_2$ terminates.

It is to be noted that the delay times $t_3$ and $t_4$ have the following relationship with each other;

$$t_2 \geqq R \cdot \theta / S \geqq t_4$$

wherein R represents the radius (mm) of the photoreceptor drum 5, S represents the peripheral velocity (mm/sec) of the photoreceptor drum 5, and $\theta$ represents the angle (rad) delimited between the shutter head 10 and the developing unit 6 with respect to the axis of rotation of the photoreceptor drum 5. This speaks that, during a period from the timing at which the initial line of the negative electrostatic latent image formed by the shutter head 10 for each page of information reaches the developing station, where the developing unit 6 is installed, to the timing at which the last line of the same negative electrostatic latent image subsequently reaches the developing station during the rotation of the photoreceptor drum 5, the bias voltage is maintained at the potential +Vb, that is, the development of the negative electrostatic latent image into a powder image is possible. Accordingly, one page of information can be accurately developed in its entirety.

On the other hand, no developing is effected with respect to the area of the photoreceptor surface from which the electrostatic charge has been depleted during the non-recording period $T_2$ as a result of a recovery operation in which the recovery voltage $V_2$ is applied to the electro-optical elements 14, because during that time the sleeve 6a is connected to the ground through the switch 12. Accordingly, any possible unnecessary waste of toner material can be advantageously avoided and, consequently, any possible contamination of the interior of the printer housing and an overload on the cleaning unit 8 can also be advantageously minimized.

Figure 9:
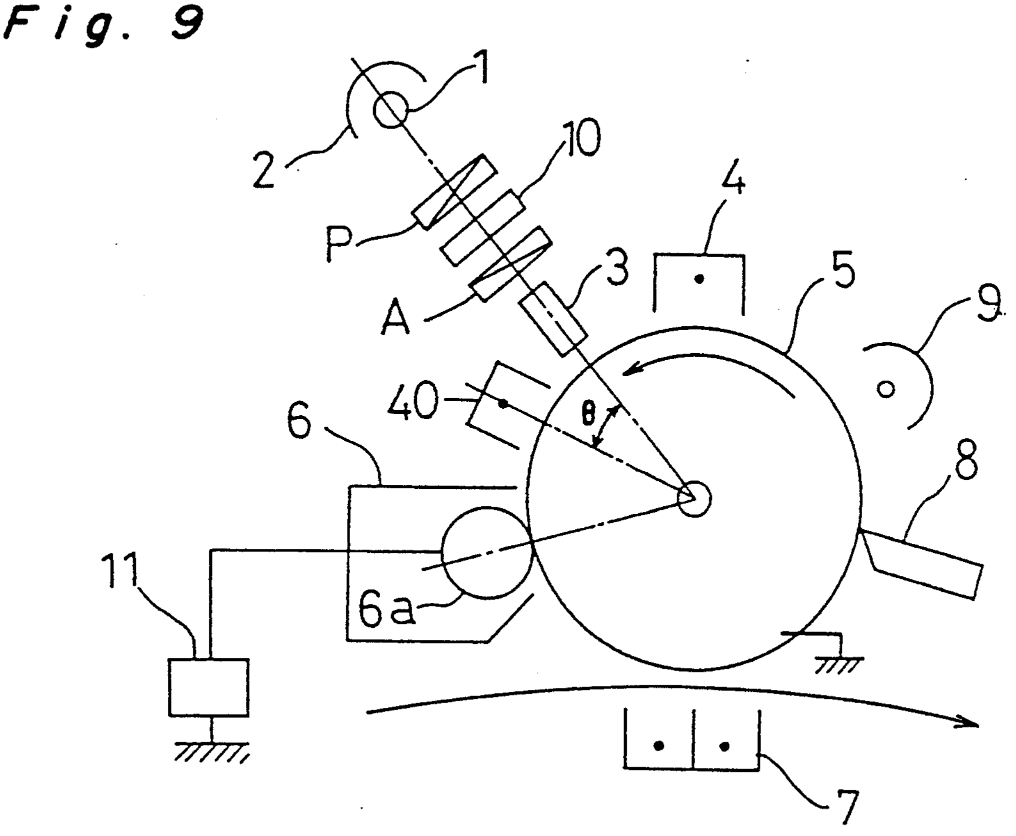
FIGS. 9 and 10 are views similar to FIGS. 1 and 8, respectively, showing another preferred embodiment of the present invention.
Figure 10:
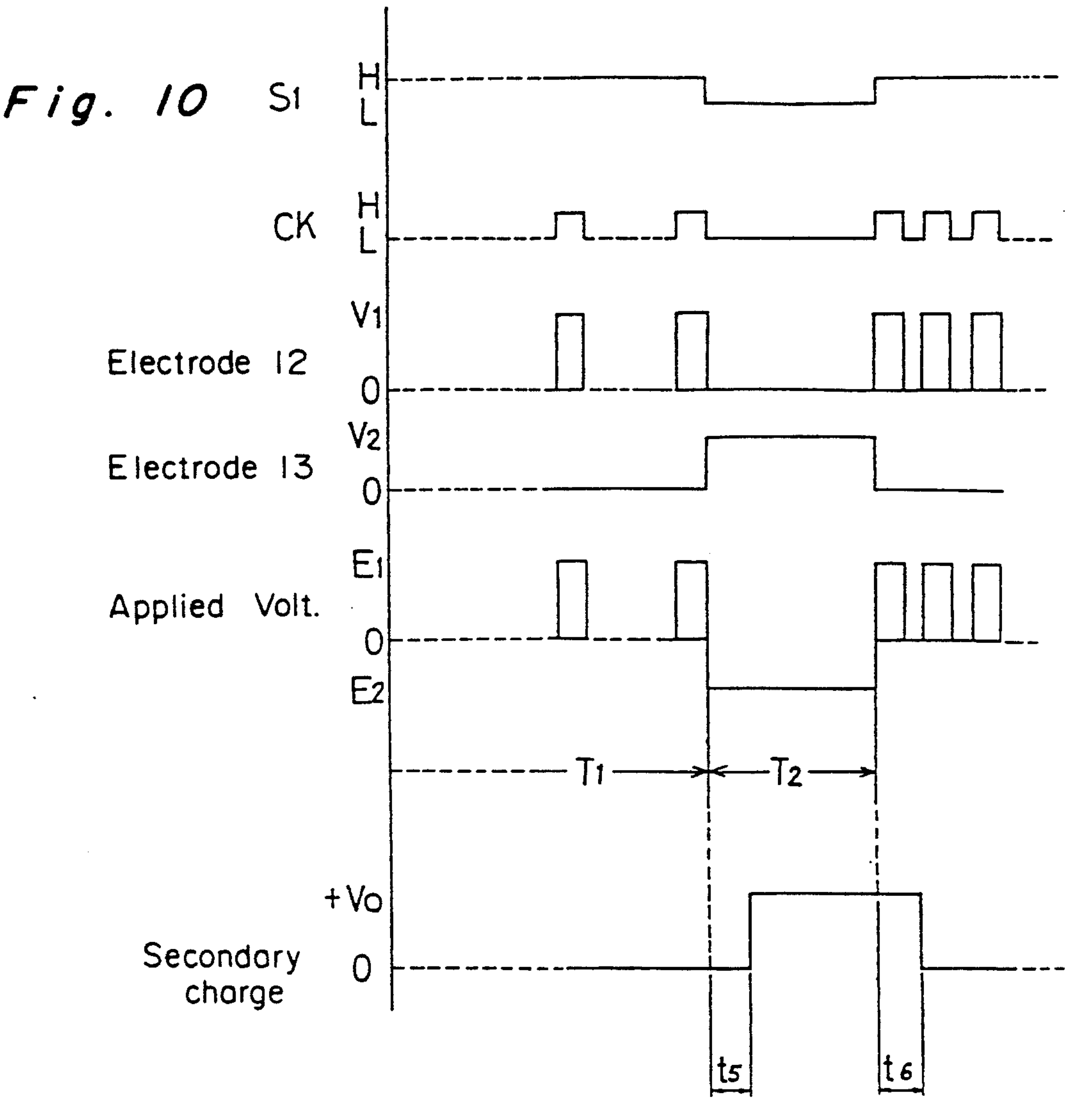

Referring now to FIGS. 9 and 10, there is shown the optical printer according to a third preferred embodiment of the present invention.

According to this third embodiment of the present invention, in order to interrupt a development of that area of the photoreceptor surface from which the electrostatic charge has been depleted during the non-recording period $T_2$ as a result of the recovery operation, a secondary charging unit 40 is installed adjacent the photoreceptor drum and between the shutter head 10 and the developing unit 6. The operation of this secondary charging unit 40 is shown in the timing chart of FIG. 10.

Referring to the timing chart of FIG. 10, as is the case with any one of the foregoing embodiments of the present invention, the secondary charging unit 40 is operated a predetermined time $t_5$ after the timing at which the control signal S1 sets up, to effect a secondary charging of the photoreceptor surface of the drum 5 uniformly to a potential +Vo. This secondary charging is interrupted a predetermined time $t_6$ after the timing at which the control signal S1 sets up.

The delay times $t_5$ and $t_6$ have the following relationship with each other;

$$t_5 \geqq R \cdot \theta / S \geqq t_6$$

wherein R represents the radius (mm) of the photoreceptor drum 5, S represents the peripheral velocity (mm/sec) of the photoreceptor drum 5, and $\theta$ represents the angle (rad) delimited between the shutter head 10 and the secondary charging unit 40 with respect to the axis of rotation of the photoreceptor drum 5. This speaks that no secondary charging is effected during a period from the timing at which the initial line of the negative electrostatic latent image formed by the shutter head 10 for each page of information reaches a secondary charging station, where the secondary charging unit 40 is installed, to the timing at which the last line of the same negative electrostatic latent image subsequently reaches the secondary charging station during the rotation of the photoreceptor drum 5. In other words, the negative electrostatic latent image corresponding to the information to be recorded is not erased and one page of information can be accurately developed into the powder image. On the other hand, that area of the photoreceptor surface from which the electrostatic charge has been erased as a result of the recovery operation during the non-recording period $T_2$ is electrostatically charged by the secondary charging unit 40 and is not therefore developed.

Figure 12A:
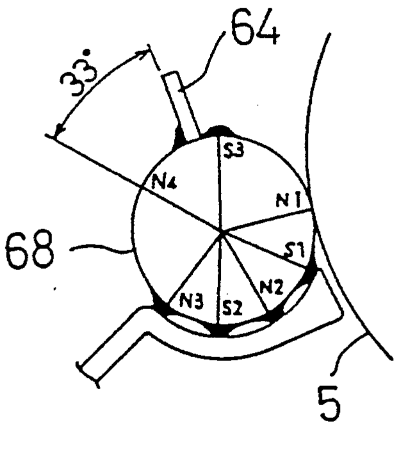
FIGS. 12(*a*) and 12(*b*) are schematic sectional views of a magnet roller used in the developing unit in different operative positions, respectively.
Figure 12B:
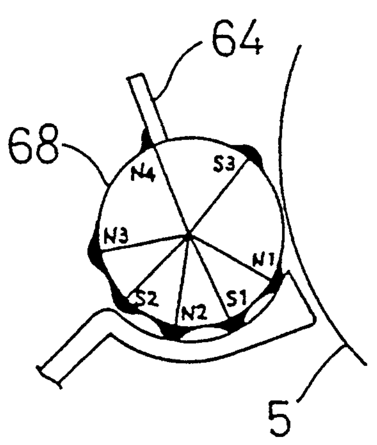
Figure 11:
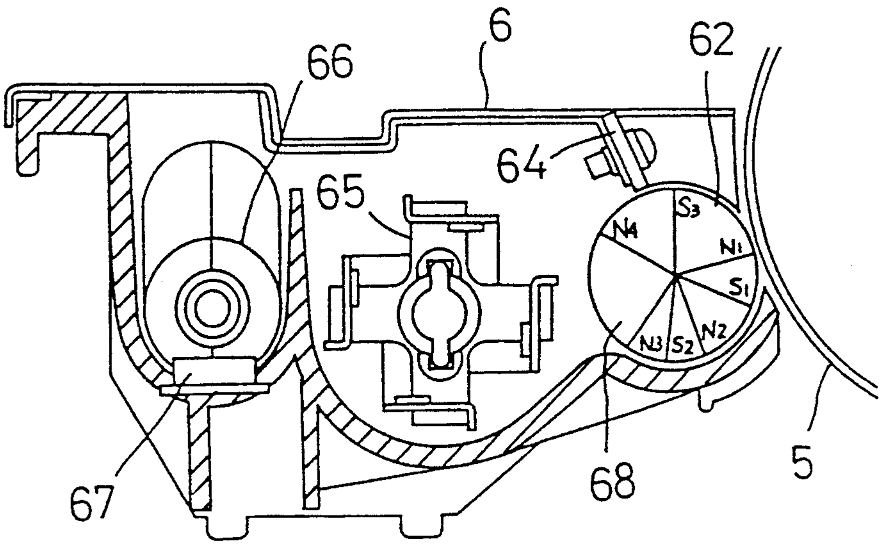
FIG. 11 is a side sectional view of a developing unit according to a further embodiment of the present invention.

The optical printer according to a fourth preferred embodiment of the present invention is shown in FIGS. 11 and 12.

According to the fourth embodiment of the present invention, in order to interrupt a development of that area of the photoreceptor surface from which the electrostatic charge has been depleted during the non-recording period $T_2$ as a result of the recovery operation, the developing unit 6 is so designed and so structured that the toner material can be retracted from the photoreceptor surface of the drum 5.

As best shown in FIG. 11, the developing unit 6 comprises a casing having receiving and delivery chambers defined therein, said receiving chamber being positioned on one side of the delivery chamber remote from the photoreceptor surface of the drum 5. The toner material supplied from a toner bottle (not shown) into the receiving chamber is transported by a delivery blade assembly 66 into the delivery chamber where a bucket roller 65 is rotatably accommodated. Within the delivery chamber, the toner material is uniformly mixed and stirred with magnetic carrier beads and is subsequently delivered onto a sleeve roller 62.

The toner mix containing the toner material and the carrier beads, when delivered onto the sleeve roller 62, forms bristles of toner mix which is in turn transported around the sleeve roller 62 towards the developing station past a position beneath a bristle regulating plate 64 which serves to regulate bristles on the sleeve roller 62 to a predetermined height. The bristles of toner mix are then applied to the photoreceptor surface at the developing station to develop the negative electrostatic latent image, formed on the photoreceptor surface, into a powder image.

In this developing unit 6, as best shown in FIGS. 12(*a*) and 12(*b*), the sleeve roller 62 includes a magnet roller 68 accommodated within the hollow of the sleeve roller 62 for rotation independent of the sleeve roller 62 so that respective positions of magnetic poles N1 to N4 and S1 to S3 relative to the photoreceptor drum 5 can be changed selectively between non-developing and developing positions. During a normal developing operation, the magnet roller 68 is, as shown in FIG. 12(*a*), in the developing position, that is, in position to allow a main magnetic pole N1 to confront the photoreceptor drum 5 so that the bristles of toner mix can brush the photoreceptor surface to accomplish the development of the electrostatic latent image into the powder image. On the other hand, during a period in which no development is performed, the magnet roller 68 is, as shown in FIG. 12(*b*), in the non-developing position, i.e., rotated 33 degrees in a clockwise direction from the developing position to assume a condition in which a portion of the bristles, which lies between the main magnet pole N1 and the magnet pole S3 while lying down confronts the photoreceptor drum 5 to avoid a direct contact of the bristles with the photoreceptor surface, thereby to avoid a deposit of toner material on the photoreceptor surface of the drum 5. Where the development is desired to be performed again, the magnet roller 68 has to be rotated 33 degrees in a counterclockwise direction to assume the initial position in which the main magnetic pole N1 confronts the photoreceptor drum 5.

The switching between the non-developing position and the developing position by changing the position of the magnet roller 68 is carried out in synchronism with the switching of the bias voltage in the manner described in connection with the second preferred embodiment of the present invention whereby the electrostatic latent image corresponding to one page of images can be accurately developed into the powder image while, during the non-recording period $T_2$, no development is effected to the area of the photoreceptor surface from which the electrostatic charge has been depleted as a result of the recovery operation.

Although the present invention has been fully described in connection with the preferred embodiments thereof with reference to the accompanying drawings, it is to be noted that various changes and modifications are apparent to those skilled in the art. By way of example, although in any one of the foregoing embodiments it has been described that, in order to recover the PLZT light shutter from the light-induced fatigue, the electric field is applied continuously for a predetermined length of time, the electric field used to recover the light shutter from the light-induced fatigue may be applied intermittently and, in such case, the electric field may be applied on the basis of image information used for the image formation during a previous cycle or may be applied at a predetermined cycle.

Accordingly, such changes and modifications are to be understood as included within the scope of the present invention as defined by the appended claims, unless they depart therefrom.

What is claimed is:

1. An image forming apparatus which comprises a light shutter disposed between a source of light and an image carrier, which is electrostatically charged to a predetermined polarity, and capable of exhibiting a light transmissivity which varies according to a voltage applied to said light shutter, an electrostatic latent image being formed on the image carrier by radiating rays of light having passed through the light shutter, said apparatus comprising:

a voltage applying means for applying a first voltage of a predetermined direction to the light shutter according to image information during a first period in which a first area on a surface of the image carrier passes across the light shutter and also for applying a second voltage of a direction counter to said predetermined direction to the light shutter during a second period in which a second area on the surface of the image carrier passes across the light shutter;

a developing means to which a predetermined bias voltage is applied, said developing means being operable to supply a developing material onto a portion of said first area having a potential lower than the developing bias voltage as a result of operation of the light shutter; and a development inhibiting means operable during the second period to inhibit a supply of the developing material onto said second area, including a charger disposed between the light shutter and the developing means, said charger being operable to apply a charge of the same polarity as said predetermined polarity to the second area.

2. The image forming apparatus as claimed in claim 1, wherein said first area is an area where the electrostatic latent image is formed and said second area is an area where no electrostatic latent image is formed.

3. The image forming apparatus as claimed in claim 1, wherein said development inhibiting means controls said second voltage to a predetermined value required for a surface potential of the image carrier not to be lowered below the bias voltage even though the image carrier is radiated by rays of light having passed through the light shutter to which the second voltage of said predetermined value is applied.

4. The image forming apparatus as claimed in claim 3, wherein said voltage applying means includes a first voltage applying circuit for applying the first voltage to the light shutter according to the image information, and a second voltage applying circuit for applying the second voltage to the light shutter.

5. The image forming apparatus as claimed in claim 4, wherein a duty ratio of said first voltage is determined in dependence on said second voltage.

6. An image forming apparatus which comprises a light shutter disposed between a source of light and an image carrier, which is electrostatically charged to a predetermined polarity, and capable of exhibiting a light transmissivity which varies according to a voltage applied to said light shutter, an electrostatic latent image being formed on the image carrier by radiating rays of light having passed through the light shutter, said apparatus comprising:

a voltage applying means for applying a first voltage of a predetermined direction to the light shutter according to image information during a first period in which a first area on a surface of the image carrier passes across the light shutter and also for applying a second voltage of a direction counter to said predetermined direction to the light shutter during a second period in which a second area on the surface of the image carrier passes across the light shutter;

a developing means to which a predetermined bias voltage is applied, said developing means being operable to supply a developing material onto a portion of said first area having a potential lower than the developing bias voltage as a result of operation of the light shutter; and a development inhibiting means operable during the second period to inhibit a supply of the developing material onto said second area, wherein said development inhibiting means controls said second voltage to a predetermined value required for a surface potential of the image carrier not to be lowered below the bias voltage even though the image carrier is radiated by rays of light having passed through the light shutter to which the second voltage of said predetermined value is applied.

7. The image forming apparatus as claimed in claim 6, wherein a duty ratio of said first voltage is determined in dependence on said second voltage.

8. An image forming apparatus which comprises a light shutter disposed between a source of light and an image carrier, which is electrostatically charged to a predetermined polarity, and capable of exhibiting a light transmissivity which varies according to a voltage applied to said light shutter, an electrostatic latent image being formed on the image carrier by radiating rays of light having passed through the light shutter, said apparatus comprising:

a voltage applying means for applying a first voltage of a predetermined direction to the light shutter according to image information during a first period in which a first area on a surface of the image carrier passes across the light shutter and also for applying a second voltage of a direction counter to said predetermined direction to the light shutter during a second period in which a second area on the surface of the image carrier passes across the light shutter;

wherein said light shutter includes a light shutter head having a row of a plurality of elements, each made of electro-optical material; a first electrode provided for each of the elements; a second electrode provided in common to all of the elements; and a pair of polarizing plates disposed between the light source and the light shutter head and between the light shutter head and the image carrier, respectively;

a developing means to which a predetermined bias voltage is applied, said developing means being operable to supply a developing material onto a portion of said first area having a potential lower than the developing bias voltage as a result of operation of the light shutter; and a development inhibiting means operable during the second period to inhibit a supply of the developing material onto said second area.

9. The image forming apparatus as claimed in claim 8, wherein said development inhibiting means includes a mechanism operable to switch the developing means selectively between a developing condition in which the developing material is supplied onto the surface of the image carrier and a non-developing condition in which no developing material is supplied onto the surface of the image carrier.

10. The image forming apparatus as claimed in claim 8, wherein said voltage applying means includes a first voltage applying circuit for applying the first voltage to the first electrodes according to the image information, and a second voltage applying circuit for applying the second voltage to the second electrode.

11. The image forming apparatus as claimed in claim 8, wherein said development inhibiting means controls said second voltage to a predetermined value required for a surface potential of the image carrier not to be lowered below the bias voltage even though the image carrier is radiated by rays of light having passed through the light shutter to which the second voltage of said predetermined value is applied.

12. The image forming apparatus as claimed in claim 11, wherein a duty ratio of said first voltage is determined in dependence on said second voltage.

* * * * *